(12) United States Patent
Juul et al.

(10) Patent No.: US 7,017,371 B2
(45) Date of Patent: Mar. 28, 2006

(54) METHOD FOR PRODUCING A GLASS

(75) Inventors: Martin Juul, Herfølge (DK); Erling Fundal, Borup (DK)

(73) Assignee: RGS90, Copenhagen S (DK)

( * ) Notice: Subject to any disclaimer, the term of this patent is extended or adjusted under 35 U.S.C. 154(b) by 387 days.

(21) Appl. No.: 10/162,798

(22) Filed: Jun. 4, 2002

(65) Prior Publication Data

US 2003/0083187 A1     May 1, 2003

Related U.S. Application Data

(63) Continuation of application No. PCT/DK00/00672, filed on Dec. 6, 2000.

(30) Foreign Application Priority Data

Dec. 6, 1999    (DK)   ............................ 1999 01742

(51) Int. Cl.
     *C03B 19/10*      (2006.01)
     *C03B 1/02*      (2006.01)
     *C03C 6/02*      (2006.01)

(52) U.S. Cl. .................. 65/134.8; 264/109; 588/252
(58) Field of Classification Search ................ 65/21.2, 65/134.8; 51/308; 588/252, 2, 10, 11; 264/109, 264/122

See application file for complete search history.

(56) References Cited

U.S. PATENT DOCUMENTS

| | | | | |
|---|---|---|---|---|
| 2,576,312 A | * | 11/1951 | Minnick | 501/36 |
| 2,652,318 A | * | 9/1953 | McKee | 264/654 |
| 4,074,991 A | | 2/1978 | Brzozowski | 65/27 |
| 4,191,546 A | | 3/1980 | Kroyer | 65/20 |
| 4,540,495 A | * | 9/1985 | Holloway | 210/774 |
| 4,720,295 A | | 1/1988 | Bronshtein | 65/2 |
| 5,063,860 A | * | 11/1991 | Vojtech | 110/256 |
| 5,203,901 A | | 4/1993 | Suzuki et al. | 65/33 |
| 5,264,007 A | * | 11/1993 | Lask | 44/564 |
| 5,304,708 A | | 4/1994 | Buehler | 588/256 |
| 5,434,333 A | | 7/1995 | Jantzen | 588/3 |
| 5,462,570 A | | 10/1995 | Balcar et al. | 65/17.1 |
| 5,797,972 A | * | 8/1998 | Schulz | 44/552 |
| 5,964,911 A | | 10/1999 | Morano et al. | 65/19 |
| 6,692,544 B1 | * | 2/2004 | Grillenzoni | 44/589 |
| 6,698,245 B1 | * | 3/2004 | Christensen et al. | 65/376 |

FOREIGN PATENT DOCUMENTS

| | | |
|---|---|---|
| DE | 4023561 | 9/1992 |
| DE | 4409263 | 9/1995 |
| DK | 2000 00204 L | 10/2000 |
| EP | 0115817 | 8/1984 |

(Continued)

*Primary Examiner*—Dionne A. Walls
*Assistant Examiner*—Carlos Lopez
(74) *Attorney, Agent, or Firm*—Winston & Strawn LLP

(57) ABSTRACT

Glass produced on basis of a raw material in form of a mixture of mainly mineral-containing components comprising sludge from e.g. purification plants and waste products from the industry, and having a determined chemical composition adjusted on basis of knowledge of the chemical composition of the mineral-containing components forming part of the glass. The glass is produced from the raw material which after mineralization is pressed into briquettes that are hardened and subsequently melted in e.g. a blast furnace under oxygen supply, and where the melt is quenched and dried. Large amounts of waste products and waste substances that are normally deposited either treated or untreated can be reused and utilized at production of the glass.

23 Claims, 1 Drawing Sheet

FOREIGN PATENT DOCUMENTS

| | | |
|---|---|---|
| EP | 0468414 A2 | 1/1992 |
| EP | 0 508 589 A1 | 10/1992 |
| EP | 0596774 | 5/1994 |
| JP | 6144892 | 5/1994 |
| JP | 10167754 | 6/1998 |
| WO | WO 95/34516 | 12/1995 |

* cited by examiner

METHOD FOR PRODUCING A GLASS

CROSS-REFERENCE TO RELATED APPLICATIONS

This application is a continuation of the U.S. national stage designation of International Application no. PCT/DK00/00672 filed Dec. 6, 2000, the content of which is expressly incorporated herein by reference thereto.

TECHNICAL FIELD

The invention relates to a method for producing a glass made on basis of a raw material in form of a mixture of mainly mineral-containing components and where the base material after an initial pretreatment is pressed into briquettes that are hardened and subsequently melted in e.g. a blast furnace under oxygen supply, and the melt is quenched and dried.

The invention also relates to a glass of the kind made on basis of a raw material in form of a mixture of mainly mineral-containing components.

The invention furthermore relates to the use of the thus compound and made glass.

BACKGROUND ART

It is well-known among persons skilled in the art that sludge from municipal purification plants constitutes a large waste problem in most industrialized countries. The sludge can e.g. be generated at a chemical treatment of sewage water which subsequently is dewatered. The dewatered sludge typically consists of 70–80% water, 10–15% organic material and 10–15% mineral components.

Sludge waste can in either wet or dried form be spread as fertilizer on farmland. The content of the sludge of e.g. heavy metals and iron and aluminum phosphates of low solubility cannot be utilized by the crops and there is therefore a risk of these substances percolating into the ground water or destroying the soil structure.

Alternatively, dried sludge waste can be deposited in very large landfills. The space requirements to the landfills mean that such sites must be open. When the sludge is exposed to precipitation, a possible content of heavy metals and trace elements will be leached out and pollute the surrounding environment.

An often used method for disposing of sludge waste is to incinerate the sludge. Hereby, an ash is produced that subsequently must be deposited. The above-mentioned heavy metals and iron and aluminum phosphates are now merely to be found in the ash, and the ash will at depositing result in the same leaching-out and percolation problems as mentioned above. To this should be added that the caloric value of dried sludge is very small compared to the caloric value of traditional combustibles. As an example of this, it can be mentioned that dried sludge has a caloric value of 12–13 MJ/kg which is about half of that of wood. The small caloric value therefore means that dried sludge is used very occasionally if ever as an energy source.

The industry produces large amounts of waste products that only very rarely can be reused and therefore also constitute a significant and costly depositing problem. By reusing the above waste products, the growing and therefore increasingly costly need for depositing areas can be reduced.

There is therefore a need for reusing in an economically advantageous way a wide range of waste products in order to thereby reduce the need and requirements to the depositing areas and without at the same time producing deposit material containing environmental harmful and health hazardous substances. The present invention now provides solutions to these problems.

SUMMARY OF THE INVENTION

The invention provides a commercially applicable glass with high hardness and wear resistance, in which sludge and a wide range of waste products from industrial machining and processing processes are used, and in which the content of the sludge and waste products of mineral-containing, environmental harmful and health hazardous substances are made unavailable to the surroundings.

Specifically, the invention relates to a method for producing glass which comprises providing a mixture of mineral-containing components from sludge from purification plants or other mineral-containing waste products and optionally including natural rocks; thermally decomposing soluble organic material from the mixture; adjusting the amount of water in the mixture to provide a water content of between 20 and 35 wt %; forming briquettes from the mixture; and melting the briquettes in the presence of oxygen to form a glass that contains more than 30 wt % inorganic components from the sludge.

If desired or necessary, the briquettes can be hardened at a temperature of between 75° C. and 110° C. to reduce the water content to 15 to 20 wt % prior to melting. Also, the briquettes can be melted under a supply of additional energy from combustion of a fuel in a quantity of a maximum of 10 wt % of the weight of the briquettes.

The invention also relates to a glass produced by this method. This glass has a mineral content that is in oxide form and contains silicon dioxide ($SiO_2$), aluminum oxide ($Al_2O_3$), ferric oxide ($Fe_2O_3$), calcium oxide (CaO), magnesium oxide (MgO) and phosphorus pentaoxide ($P_2O_5$) which together constitute at least 90 wt % of the glass. These components are preferably present in certain desirable ratios as disclosed herein.

The invention also discloses a sand blasting medium comprising one of the glasses disclosed herein. This medium Can be utilized in a method for abrading a substrate wherein a substrate is abraded for a sufficient time until a desired surface profile is achieved.

DETAILED DESCRIPTION OF THE PREFERRED EMBODIMENTS

Figure 1:
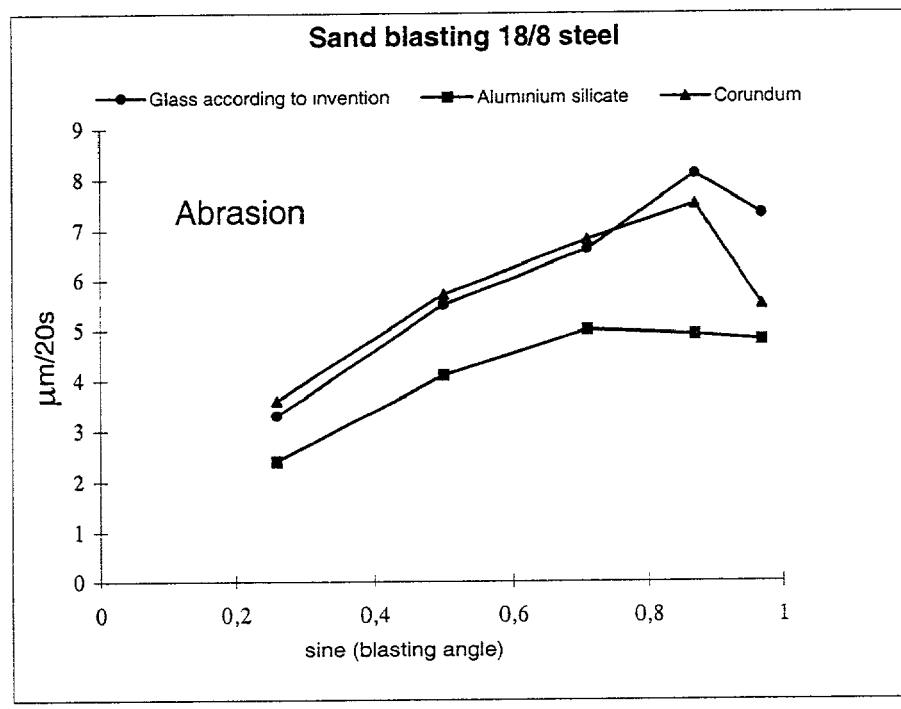
FIG. 1 shows the results of sand blasting 18/8 steel where the blowing agents are the glass produced in example 2, aluminum silicate and corundum, respectively.

The novel and unique features of the glasses according to the invention are achieved because of the pretreatment that is used. This pretreatment comprises producing a mixture of mineral-containing components from sludge from e.g. purification plants or one or several other mineral-containing waste products that may include natural rocks.

When the one or several mineral-containing waste products and/or natural rocks have a content of larger size components, these can advantageously be reduced in size before preparing the mixture to thus provide a porous mixture that easily can be aerated.

When oxygen is admitted to such a mixture, the mixture will self-ignite, and the sludge content of fat, protein and soluble carbohydrate will be decomposed to water and $CO_2$ at a temperature of about 60–70° C.

The above thermal treatment of the mixture of mineral-containing components will in the following be called mineralization. Complete decomposition of fat, protein and soluble carbohydrate will typically be completed in 20–40 days.

The pretreatment includes subsequently adjusting the water content of the mixture to between 20 and 35 wt %, and preferably between 27 and 33 wt %. By adjusting the water content, the mixture will be suited for being pressed into briquettes, the dimensions of which are over 60 mm in an especially advantageous embodiment.

When the water content of the briquettes is greater than 35 wt %, the briquettes will not be solid or able to maintain a homogenous shape. At water contents of less than 20 wt %, there will be segregations that reduce the strength of the briquettes inexpediently.

Homogenous briquettes are packed and are best utilized in a later combustion process, e.g., in a blast furnace.

By adjusting the water content of the briquettes as described above, the subsequent hardening of the briquettes can pass off optimally so that the briquettes maintain a homogenous shape. The hardening can take place, for example, at a temperature of between 75° C. and 110° C. until the briquettes have a water content of 15–20 wt %.

Specific examples of advantageous conditions of hardening are hardening at a temperature of 110° C. for three hours, or a hardening at 80° C. for six hours. In both cases, briquettes with unhardened centers and hardened shells are obtained. By this hardening, non-hygroscopic briquettes can be produced that have a hard surface and a density of between 1.2–1.3 $g/cm^3$.

Due to the hygroscopic properties of the briquettes, these are very storage stable. Due to their exceptionally hard surface, they can stand violent mechanical handling. It is therefore possible to store the continuously produced briquettes and thus advantageously continuously dispose of waste material.

The briquettes can be melted under oxidizing conditions in a blast furnace using known technologies to thus bring the entire mineral content of the melt to oxide form. As an example of known technology, the Anderson technique known from U.S. Pat. No. 3,729,198 can be mentioned but other forms of melting can also be used, if desired.

Only small amounts of certain elements, such as sulphur, zinc, or chlorine, are lost during melting as they can leave as gases or sublimates.

The briquettes are melted into a glass at a temperature of between 1400 and 1500° C., and the specific structure of the briquette with an unhardened center and a very hard surface causes the combustion reactions to pass off in both the center and the shell of the briquettes. When the briquettes are given the above well-defined form and dimension, the combustion reactions will also take place in the gaps between the packed briquettes in the blast furnace or other melting device.

Even though the energy content of the briquettes, in form of insoluble organic material, is smaller than the energy content of traditional fuels, it is possible to melt the briquettes with a minimum input of extra fuel by controlling the oxygen-containing supply air. The preferred fuel is coke which in an advantageous embodiment is not used in amounts greater than 10 wt % of the amount of briquettes that is to be melted.

In another preferred embodiment of the method according to the invention, the briquettes have an energy content that is sufficient for the briquettes to melt completely without the presence of extra fuel.

The resulting melt is quenched whereby a slag is formed that at least partly granulates of itself. This slag consists of 100% glass, i.e. often colored black due to a content of iron oxide.

The granulated slag can subsequently be crushed and divided into smaller grains, the sizes of which depend on the intended application. The divided grains can, if desired, be fractionated by size to make a specific fraction especially suited for a later purpose.

By making a number of demands on the chemical composition of the mineral-containing components that form part of the raw material of the glass, a glass can be provided that has a hardness which is greater than 600, measured on Vickers hardness scale.

In addition to sludge from, e.g., a purification plant, the raw material also includes one or several other mineral-containing waste products from the industry. These waste products can, e.g., form part of the raw material as the only additional mineral-containing components.

As a first alternative to the above mixture, the raw material can be a mixture of sludge, mineral-containing components and natural rocks. In another alternative raw material, the mixture can include sludge and natural rocks.

In order to be able to satisfy the demands on the chemical composition of the glass, it is necessary to know the chemical composition of all the constituent mineral-containing components. Such a knowledge can advantageously and inexpensively be obtained by analysing the mineral-containing components by means of X-ray fluorescence. The mixing of the different mineral-containing components can then be based on these analytical results so that by means of the method described above, a glass can be produced in which more than 30 wt % inorganic components originate from sludge.

| | |
|---|---|
| Car shreds | the light fraction from car breaking |
| Hammer scales | oxide scales from rolling of steel |
| Moulding sand | used foundry moulding sand, including furan sand and bentonite sand |
| Garnet | used sandblasting sand of the garnet type, (almandite, a silicate of Al, Fe, and Mg) |
| Aluminium silicate | used sandblasting sand |
| Corundum | used sandblasting sand mainly in form of glass from bottom slag from electric power plants |
| Fireproof MgO bricks | fireproof molten metals or moulded bricks mainly made of the mineral periclase (MgO) |
| Chamotte bricks | fireproof materials made of the aluminium silicates silimanite and kaolin together with a small amount of quartz |
| Ash from PVC | Filler material from pyrolytic PVC and consisting of mixtures of $TiO_2$, $CaCO_3$, kaolin ($Al_2SiO_4$ (OH)) and talc ($MgSiO_4$ (OH)) |
| Paper waste | Waste material from manufacture of paper and consisting of wood fibres and mineral-containing paper filler material, such as lime, kaolin and talc |

Such waste products can contain larger size components which have to be divided into smaller particles before entering in the mineralization.

The chemical composition of the glass can be calculated from the knowledge of the chemical composition of the individual mineral-containing components that form part of the glass and that are advantageously combined in consideration of a number of chemical demands which means that the glass is hard and that its content of minerals that are harmful to the environment and the health has been made unavailable to the surroundings.

The mineral content of the glass is at melting brought to oxide form and the weight percentage of the formed mineral oxides $SiO_2$, $Al_2O_3$, $Fe_2O_3$, CaO, MgO and $P_2O_5$ together make up at least 90 wt % of the glass, and in an especially preferred embodiment, the mineral oxides together make up at least 95 wt % of the glass.

To give to the glass having the above chemical composition a hardness that is greater that 600 on Vickers hardness scale and in which the content of minerals that are harmful to the environment and the health is made unavailable, the $CaO/P_2O_5$ ratio in the glass must furthermore satisfy the equations $$\text{wt \% CaO} \geq 1.33 * \text{wt \% } P_2O_5$$

and $$\frac{(\text{wt \% CaO} - 1.33 * \text{wt \% } P_2O_5)) + \text{wt \% MgO}}{\text{wt \% } SiO_2}$$

which in the following is called the basicity $(B_i)$ must be between 0.15 and 0.5 in the cases where (wt % CaO–1.33*wt % $P_2O_5$)>0.

In order to get a balanced ratio between silicon dioxide, aluminum oxide and ferric oxide, the chemical composition of the glass must also satisfy the demands that the silicate modulus $$M_s = \frac{SiO_2}{Al_2O_3}$$

is between 2.2 and 3.2, and the iron modulus $$M_f = \frac{Fe_2O_2}{Al_2O_3}$$

is between 0.56 and 1.00.

When the demands on the chemical composition are satisfied, the glass will have a specific density which is between 2.7 and 3.1 g/cm$^3$, preferably between 2.8 and 3 g/cm$^3$, and especially 2.9 g/cm$^3$.

When the above demands on the mineral oxides have been satisfied, a glass is obtained that mainly consists of the mineral oxides mentioned in Table 1 below. The glass will also have a very small content of microelements. The content of such microelements in the glass is as indicated in Table 2. These microelements can be toxic or carcinogenic but have been made unavailable to the surroundings when the glass is produced by means of the method according to the invention.

TABLE 1

| Mineral oxide | Content in glass |
| --- | --- |
| $SiO_2$ | 35–50 wt % |
| $Al_2O_3$ | 15–25 wt % |
| $Fe_2O_3$ | 5–15 wt % |
| CaO | 5–20 wt % |
| MgO | 1–10 wt % |
| $MnO_2$ | <1 wt % |
| $TiO_2$ | <3 wt % |
| $P_2O_5$ | 1–10 wt % |
| $K_2O$ | <2 wt % |
| $Na_2O$ | <2 wt % |
| Others | <5 wt % |

TABLE 2

| Microelements | Content in glass | |
| --- | --- | --- |
| Sb | <0.007 wt % | Toxic |
| Pb | <0.020 wt % | microelements |
| Cd | <0.009 wt % | |
| Sn | <0.043 wt % | |
| As | <0.009 wt % | Carcinogenic |
| Be | <0.007 wt % | microelements |
| Cr | <0.001 wt % | |
| Co | <0.007 wt % | |
| Ni | <0.022 wt % | |

A glass on which the above demands have been made to the chemical composition of the content of mineral oxides and which is produced by means of the method according to the invention, can most advantageously be used as a blowing agent or abrasive medium in sand blasting.

Alternatively, the granulated slag can be cast and used for producing slag wool.

Furthermore, the glass can, in cases where it is not used, be recycled as mineral-containing waste product in the glass according to the invention.

By means of the method according to the invention, a glass is produced in which environmental harmful and health hazardous substances are made unavailable to leaching. The glass can therefore also be used as filler for many purposes, for example in concrete and asphalt.

The many different forms of application of the glass according to the invention and the reuse of mineral-containing waste products mean that considerable amounts of costly raw materials can be saved. In addition, the ever-growing amounts of waste products are reduced and the need for landfills is reduced considerably.

EXAMPLES

In the following examples of mixtures of raw material, the part of waste from industry and waste disposal is more than 95 wt %. The chemical composition of all types of waste is known and determined by means of X-ray fluorescence. In the following, the term sludge ash is applied to dried, thermal-treated, dewatered sludge. Other mineral-containing components are mentioned using the above designations:

Example 1 (Laboratory Scale)

The raw material consists of a mixture of 34.4 wt % sludge ash and 13.8 wt % shreds which are incinerated, and added 23.8 wt % foundry sand, 4.0 wt % fireproof MgO bricks, 5.6 wt % used $Al_2O_3$ and 18.4 wt % chalk. The mixture is crushed to a particle size smaller than 0.2 mm and heated in platinum crucible or laboratory furnace to 1450° C. for 6 hours. The result is a melt that granulates after quenching in water. Polarizing microscopy shows that the melt is a black glass with a density of 3.0 g/cm³ and having a chemical composition as stated in Table 3 below:

TABLE 3

| Mineral | wt % of the total glass weight |
|---|---|
| $SiO_2$ | 43.4 |
| $Al_2O_3$ | 14.5 |
| $Fe_2O_3$ | 9.2 |
| CaO | 18.1 |
| MgO | 5.4 |
| $MnO_2$ | 0.1 |
| $TiO_2$ | 0.6 |
| $P_2O_5$ | 7.3 |
| $K_2O$ | 0.9 |
| $Na_2O$ | 1.0 |
| SrO | 0.3 |
| $SO_3$ | 0.03 |
| Others | — |
| Σ | 100.8 wt % |

The thus obtained glass has a basicity $B_i$=0.32, an iron modulus $M_f$=0.63 and a silicon modulus $M_s$=1.85 and therefore satisfies the demands on the chemical composition.

The glass has been analysed for leaching at pH 4 and pH 7, respectively. The leaching was carried out with 100 l water per kilo glass for 3 hours. According to a normally applied standard method from "Vandkvalitetsinstitut" (=Institute of water quality) in Denmark, samples from both leachings were pooled and analysed by means of atomic absorption photometry and in graphite furnace. The following leaching results were hereby obtained:

TABLE 4

| Mineral | Leached concentration in ppm | % of original mineral content |
|---|---|---|
| Cr | <0.1 | <0.02 |
| Cd | 0.02 | 1 |
| Ni | 0.8 | 0.4 |
| Pb | 0.06 | 0.03 |
| Sb | 0.08 | 0.15 |
| Be | <0.04 | <4 |
| Co | 4.2 | 14 |
| Sn | 0.18 | 0.18 |
| Mo | 0.4 | 0.43 |

From Table 4 it appears that only a very small part of the original content of elements is leached.

Example 2 (Pilot Plant Scale)

Figure 2:
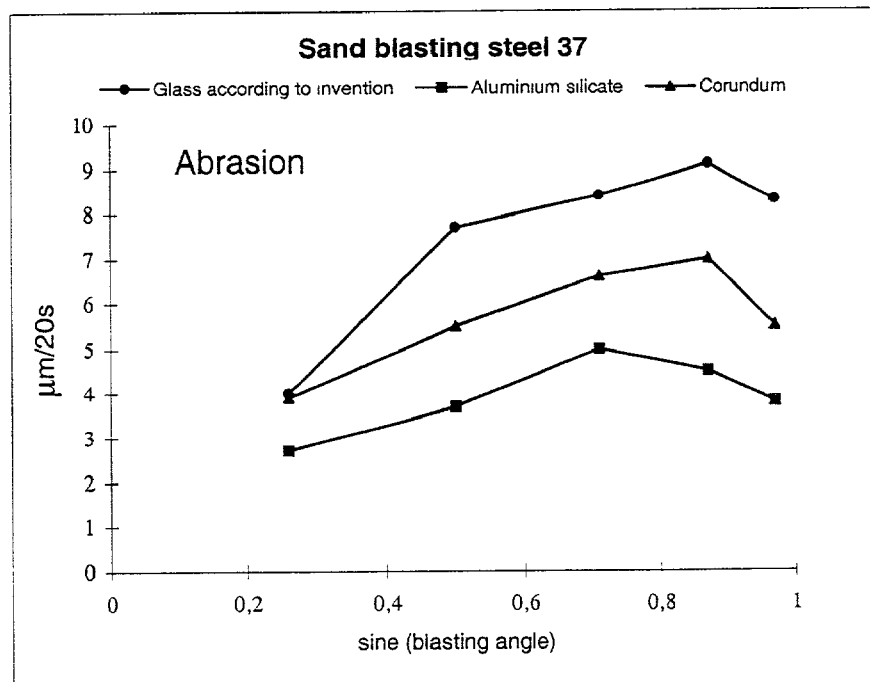
FIG. 2 shows the result of sand blasting steel 37 where the blowing agents are the glass produced in example 2, aluminum silicate and corundum, respectively.

The raw material consists of a mixture of 33 wt % sludge ash, 10 wt % foundry sand, 6 wt % steel grit, 4.0 wt % used fireproof MgO bricks, 11 wt % used garnet, 20 wt % mineralized sludge, 8 wt % used $Al_2O_3$, and 8 wt % limestone. The mixture is crushed to a particle size that is smaller than 3 mm and melted completely in gas-fired pilot revolving furnace at 1490° C. The result is a melt that granulates after quenching in water. The resulting glass is dried, crushed and sieved to a fraction with a particle size of 0.4–1.4 mm. The sieved fraction was tested as blowing agent in sand blasting of 18/8 steel and steel 37, respectively. A corresponding test was carried out with corundum ($HV_{100}$=1800) and aluminum silicate ($HV_{100}$=600) sand blasting. The results of the tests performed are shown in the accompanying FIG. 1 and FIG. 2.

These drawing figures show that the glass according to the invention performs significantly better than aluminum silicate and corundum for sand blasting both 18/8 steel and steel 37 irrespective of blasting angle. The glass is just as good as aluminum silicate in sand blasting of 18/8 steel. The best results are however obtained at blasting angles over about 50° (sine 50°=0.77). The glass proves significantly better than aluminum silicate for sand blasting steel 37 at all tested blasting angles.

Example 3 (Industrial Scale)

75.5 wt % mineralized sludge, the largest particle size of which is not greater than 4 mm, 1.8 wt % steel grit, 11.5 wt % dolomite, 7.3 used $Al_2O_3$, and 4 wt % limestone are mixed and briquetted. The water content in the briquettes is 32 wt % and the briquettes have a caloric value of 9.5 MJ/kg. The briquettes are hardened in furnace at 110° C. to an average water content of 20 wt %. The briquettes are then melted under oxygen supply in blast furnace at 1490° C. partly with a supply of coke of 28 wt % and partly with a supply of coke of 10 wt %. The melt is then quenched in water. After oxidation at 500° C., an analysis showed that the briquettes had the composition in Table 5:

TABLE 5

| | Content in wt % in supplied mineralised end product | Content in wt % of mineralised end product at melting with 28% coke | Content in wt % in mineralised end product at melting with 10% coke |
|---|---|---|---|
| $SiO_2$ | 41.6 | 46.2 | 40.2 |
| $Al_2O_3$ | 15.2 | 16.9 | 15.3 |
| $Fe_2O_3$ | 12.4 | 4.5 | 7.2 |
| CaO | 14.9 | 22.2 | 21.2 |
| MgO | 4.3 | 6.4 | 6.9 |
| $MnO_2$ | 0.2 | 0.2 | 0.2 |
| $TiO_2$ | 0.9 | 1.0 | 0.8 |
| $P_2O_5$ | 6.5 | 1.3 | 3.7 |
| $K_2O$ | 1.6 | 0.9 | 1.5 |
| $S_{total}$ | 1.0 | — | — |
| C | 6.0 | — | — |
| $B_i$ | 0.25 | 0.58 | 0.57 |
| $M_s$ | 1.5 | 2.15 | 1.78 |
| $M_f$ | 0.81 | 0.26 | 0.47 |

From Table 5 it appears that when a coke quantity of 28 wt % is used, iron and phosphorus smelt out. It also appears that a combination of the energy content in 10% coke and the caloric value of the briquettes themselves is sufficient to melt the briquettes.

Example 4 (Industrial Scale, Test of Hardness and Hygroscopic Properties)

70.0 wt % mineralized sludge, 7.0 wt % foundry sand, 1.4 wt % olivine sand, 6.2 wt % wood crushed to a size of 20 mm, 8.7 wt % treated grain remainings, 0.9 wt % used garnet, and 5.5 wt % limestone are mixed and mineralized for 40 days. The water content of the briquettes drops during the mineralization from 56.4 wt % to 39.2 wt %, the pyrogas content drops from 37.3 wt % to 25.8 wt %, the charcoal content changes from 12.4 wt % to 13.2 wt %, and the ash fraction increases from 50.3 wt % to 59.8 wt %. The caloric value of the briquettes drops from 11 MJ/kg to 8.9 MJ/kg. The mixture is adjusted to five different water contents as indicated in Table 6. The mixture was pressed to briquettes with a diameter of 60 mm and hardened in aerated furnace at 110° C. for 1.5 and 3 hours respectively.

TABLE 6

| Test no. | wt % water | Density of hardened briquette (g/cm³) | wt % after 1.5 hours hardening | wt % after 3 hours hardening | Consistency before hardening |
|---|---|---|---|---|---|
| 1 | 23.3 | 1.28 | — | — | Segregation cracks |
| 2 | 26.7 | 1.22 | — | — | Solid |
| 3 | 33.3 | 1.20 | 23.0 | 14.6 | Solid |
| 4 | 39.2 | 1.16 | 25.5 | 16.9 | Solid |
| 5 | 47.1 | 1.20 | — | — | Soft |

Table 6 shows that at greater water contents, the mineralised raw material becomes so soft that it only can be handled with difficulty in the briquette press. The produced briquettes become unhomogeneous and can therefore not provide optimum packing and aeration conditions in the blast furnace.

5 briquettes of each type of briquettes had a total weight of between 800 and 1400 g. Each type briquette was put in a bag and analysed by drop test on stone floor. After 5 and 10 drops respectively, the briquette material was sieved on 4 mm sieve. The results of the test are shown in Table 7.

TABLE 7

| Test no. | Hardening time | wt % particles ≥ 4 mm at 5 drops | wt % particles ≥ 4 mm at 10 drops |
|---|---|---|---|
| 1 | 1.5 h | 22.7 | |
| | 3.0 h | | |
| 2 | 1.5 h | 7.8 | |
| | 3.0 h | 5.9 | 13.4 |
| 3 | 1.5 h | 2.0 | |
| | 3.0 h | 1.0 | 11.8 |
| 4 | 1.5 h | 1.2 | 2.4 |
| | 3.0 h | | 2.5 |
| 5 | 1.5 h | 1.0 | 2.0 |
| | 3.0 h | | 2.8 |

The results show that hardening gives the best results when the briquettes have a water content of between 25 wt % and 35 wt %.

What is claimed is:

1. A method for producing glass which comprises:
providing a mixture of mineral-containing components from sewage sludge containing organic material and mineral-containing waste products and optionally including natural rocks;
thermally decomposing soluble organic material from the mixture to form a thermally treated mixture;
adjusting the amount of water in the thermally treated mixture to provide a water adjusted mixture having a water content of between 20 and 35 wt %;
forming briquettes from the water-adjusted mixture; and
melting the briquettes in the presence of oxygen to form a glass that contains more than 30 wt % inorganic components from the sludge.

2. The method of claim 1, wherein the briquettes are melted under additional energy supply from combustion of a fuel in a quantity of a maximum of 10 wt % of the weight of the briquettes.

3. The method of claim 1, wherein the briquettes have a density of 1.2 to 1.3 g/cm3.

4. The method of claim 1, wherein the briquettes have a water content of between 27–33 wt %.

5. The method of claim 1, which further comprises hardening the briquettes at a temperature of between 75° C. and 110° C. to reduce the water content to 15 to 20 wt % prior to melting.

6. The method of claim 1, wherein the glass that is produced has a mineral content in oxide form and contains silicon dioxide (SiO2), aluminum oxide (Al2O3), ferric oxide (Fe2O3), calcium oxide (CaO), magnesium oxide (MgO) and phosphorus pentaoxide (P2O5) which together constitute at least 90 wt % of the glass.

7. The method of claim 6, wherein the calcium oxide and phosphorus pentaoxide are present in a weight ratio that is greater than or equal to 1.33 in the glass that is produced.

8. The method of claim 6, wherein the calcium oxide, phosphorus pentaoxide, magnesium oxide and silicon dioxide are present in the glass that is produced in amounts such that the value of the equation:

$$\frac{(\text{wt \% CaO} - (1.33 * \text{wt \% P2O2})) + \text{wt \% MgO}}{\text{wt \% SiO}_2}$$

is between 0.15 and 0.5.

9. The method of claim 6, wherein the ferric oxide and aluminum oxide are present in a weight ratio of between 0.56 and 1.00 in the glass that is produced, and that the silicon oxide and aluminum trioxide are present in a weight ratio of between 2.2 and 3.2 in the glass that is produced.

10. The method of claim 1, wherein the glass that is produced has a specific density that is between 2.7 and 3.1 g/cm3.

11. The method of claim 1, wherein the glass that is produced has a hardness of HV100 that is greater than or equal to 600.

12. A method for producing glass which comprises:
providing a mixture of mineral-containing components from sludge from purification plants or other mineral-containing waste products and optionally including natural rocks;
thermally decomposing soluble organic material from the mixture to form a thermally treated mixture;
adjusting the amount of water in the thermally treated mixture to provide a water adjusted mixture having a water content of between 20 and 35 wt %;
forming briquettes from the water-adjusted mixture; and
melting the briquettes in the presence of oxygen to form a glass that contains more than 30 wt % inorganic components from the sludge;
quenching the melted glass to form granulates; and
drying the granulates to form glass particles.

13. The method of claim 12, wherein the dried glass particles are crushed and sieved to a final particle size of 0.4–1.4 mm.

14. The method of claim 12, wherein the briquettes are melted under additional energy supply from combustion of a fuel in a quantity of a maximum of 10 wt % of the weight of the briquettes.

15. The method of claim 12, wherein the briquettes have a density of 1.2 to 1.3 g/cm3.

16. The method of claim 12, wherein the briquettes have a water content of between 27–33 wt %.

17. The method of claim 12, which further comprises hardening the briquettes at a temperature of between 750° C. and 110° C. to reduce the water content to 15 to 20 wt % prior to melting.

18. The method of claim 12, wherein the glass that is produced has a mineral content in oxide form and contains silicon dioxide (SiO2), aluminum oxide (Al2O3), ferric oxide (Fe2O3), calcium oxide (CaO), magnesium oxide (MgO) and phosphorus pentaoxide (P2O5) which together constitute at least 90 wt % of the glass.

19. The method of claim 18, wherein the calcium oxide and phosphorus pentaoxide are present in a weight ratio that is greater than or equal to 1.33 in the glass that is produced.

20. The method of claim 18, wherein the calcium oxide, phosphorus pentaoxide, magnesium oxide and silicon dioxide are present in the glass that is produced in amounts such that the value of the equation:

$$(\text{wt \% CaO} - (1.33 * \text{wt \% P2O2})) + \text{wt \% MgO} / \text{wt \% SiO2}$$

is between 0.15 and 0.5.

21. The method of claim 18, wherein the ferric oxide and aluminum oxide are present in the glass that is produced in a weight ratio of between 0.56 and 1, and that the silicon oxide and aluminum trioxide are present in a weight ratio of between 2.2 and 3.2 in the glass that is produced.

22. The method of claim 12, wherein the glass that is produced has a specific density that is between 2.7 and 3.1 g/cm3.

23. The method of claim 12, wherein the glass that is produced has a hardness of HV100 that is greater than or equal to 600.

* * * * *

UNITED STATES PATENT AND TRADEMARK OFFICE
CERTIFICATE OF CORRECTION

PATENT NO.       : 7,017,371 B2                                   Page 1 of 1
APPLICATION NO.  : 10/162798
DATED            : March 28, 2006
INVENTOR(S)      : Juul et al.

It is certified that error appears in the above-identified patent and that said Letters Patent is hereby corrected as shown below:

Column 11:
Line 6, change "750°C." to -- 75°C. --.

Column 12:
Lines 3-4, replace the equation with the following:

$$\frac{(wt\% \; CaO - (1.33 * wt\% \; P2O2)) + wt\% \; MgO}{wt\% \; SiO2}$$

Signed and Sealed this

Twenty-fourth Day of October, 2006

JON W. DUDAS
*Director of the United States Patent and Trademark Office*